United States Patent [19]

Busch et al.

[11] 3,937,672

[45] Feb. 10, 1976

[54] PROCESS FOR THE MANUFACTURE OF CONSOLIDATED SHAPED STRUCTURES OF CELLULOSE HYDRATE

[75] Inventors: Walter Busch, Wiesbaden-Biebrich; Klaus-Dieter Hammer, Mainz; Wolfgang Klendauer, Wiesbaden, all of Germany

[73] Assignee: Hoechst Aktiengesellschaft, Germany

[22] Filed: Sept. 20, 1973

[21] Appl. No.: 399,086

[30] Foreign Application Priority Data

Sept. 23, 1972 Germany.................... 2246829

[52] U.S. Cl. ............... 260/17.3; 264/195; 264/236
[51] Int. Cl.$^2$...................... G08L 1/06; D01F 11/02
[58] Field of Search ............. 264/236, 195; 260/17.3

[56] References Cited
UNITED STATES PATENTS

| | | | |
|---|---|---|---|
| 2,322,981 | 6/1943 | Ubbelohde.......................... | 264/195 |
| 2,992,880 | 7/1961 | Toms.................................. | 264/195 |
| 3,016,283 | 1/1962 | Schappel............................ | 264/195 |
| 3,224,182 | 12/1965 | Sloan et al......................... | 264/195 |
| 3,445,556 | 5/1969 | Kuzmak et al..................... | 264/195 |
| 3,472,606 | 10/1969 | Getchell............................. | 260/17.3 |
| 3,473,885 | 10/1969 | Stanley.............................. | 264/195 |
| 3,509,249 | 4/1970 | Kuzmak et al..................... | 264/195 |
| 3,553,306 | 1/1971 | Church.............................. | 264/188 |

Primary Examiner—Harold D. Anderson
Assistant Examiner—Edward Woodberry
Attorney, Agent, or Firm—James E. Bryan

[57] ABSTRACT

This invention relates to a process for the preparation of a cellulose hydrate moulding which comprises (a) treating a cellulose hydrate moulding while in the gel state, for a period within the range of from 10 seconds to 20 minutes, with an aqueous liquid having dissolved therein at least one plasticizer, a chemical cross-linking agent comprising at least one cyclic urea compound having at least 2 N-methylol groups, and at least one cross-linking catalyst, (b) drying the moulding to a residual water content of from 8 to 12% by weight, and (c) heating the moulding at a temperature within the range of from 100° to 150°C for a period of from 30 seconds to 20 minutes. The invention also relates to a cellulose hydrate moulding prepared by the novel process.

22 Claims, No Drawings

PROCESS FOR THE MANUFACTURE OF CONSOLIDATED SHAPED STRUCTURES OF CELLULOSE HYDRATE

This invention relates to a process for the manufacture of consolidated shaped structures, hereafter referred to as mouldings, of cellulose hydrate, which, as a consequence of the consolidation, have high resistance to swelling.

The term "shaped structures" or "mouldings" are used especially to mean strands, bands, and, in particular, films and tubes, of cellulose hydrate.

Tubes according to the invention are especially useful for the manufacture of sausage casings.

A large number of methods of cross-linking and cross-linking reactions for cellulose fibers and regenerated cellulose fibers have been proposed, ranging from simple processing to providing the fibers with a swelling-resistant, shrink-resistant and crease-resistant finish. The previously proposed processes share the characteristic that the cross-linking agent is caused to act on the finished fibers or films, that is to say on mouldings in which the cellulose material formed is no longer in the gel state.

Although fibers, because of their shape and structure, are more readily accessible than are tubes or films to the action of liquids which cause the cross-linking of the material from which they are formed, the cross-linking agent nevertheless reaches only zones near the surface when the previously proposed processes are used. In consequence, the abrasion resistance is reduced and an embrittlement and hardening of the material which forms the fibers, associated with a distinct decrease in strength cannot be effectively prevented.

A process also has been proposed according to which a cross-linking liquid is caused to act on a cellulose hydrate film. This process also begins from a finished film, that is to say from a film which, in addition to plasticizer, contains only the customary amount, approximately 8 to 12%, of water as a residual swelling agent, that is to say a film which is no longer in the gel state. In this process, uniform impregnation of the film over its cross-section by means of cross-linking liquid is not possible, since the cross-linking liquid does not penetrate the film adequately. Accordingly, cellulose hydrate tubes or films treated by this process are unevenly cross-linked over their cross-section. There is the danger that cross-linking takes place to such an extent in the zones near the surface that embrittlement occurs there. Such films or tubes therefore do not possess optimum strength or resistance to swelling.

Apart from the fact that the desired effect of improving the quality is unsatisfactory in the case of fibers or cellulose hydrate films which have been subjected to previously proposed cross-linking processes, these processes also have the considerable disadvantage that the impregnation times of at least 12 hours which must be observed are extremely long. Impregnation times of 12 hours and above, however are not feasible in a continuous process, for technological reasons. It is a further disadvantage of these processes that the cross-linking liquid used must contain the cross-linking agent in extremely high concentration of 25 to 30%, as a result of which there is the additional danger that embrittlement takes place within the zones of the treated mouldings which are near the surface.

Another disadvantage of the previously proposed processes for cross-linking cellulose hydrate mouldings is that the cross-linking must be carried out at relatively high temperatures, generally about 160°C, since otherwise the desired improvement in the strength and resistance to swelling does not take place, or takes place to an insufficient extent.

The subsequent impregnation of a plasticized cellulose hydrate tube which has been already largely freed of the swelling liquid implies an additional process step as compared to the normal manufacturing processes; this considerably detracts from the economics of the process. This is because after impregnation with the cross-linking solution the tube must be dried once again and thereafter exposed to higher temperatures so as to achieve adequate cross-linking.

Within the scope of the present invention, the terms "finished film" or "finished tube" are to be understood as meaning a cellulose hydrate moulding, as previously mentioned, which after drying still contains approximately 8 to 12% of water relative to the total weight of the moulding, as the swelling agent, and approximately 16 to 24% of plasticizer relative to the total weight of the moulding.

Cellulose hydrate tubes subjected to the previously proposed cross-linking processes are not uniformly cross-linked over the cross-section of their wall and therefore do not possess adequate strength and resistance to swelling. In this invention, the swelling factor is treated as a measure of the resistance of the moulding to swelling.

The present invention provides a process for the preparation of a cellulose hydrate moulding which includes a. treating a cellulose hydrate moulding while in the gel state, for a period within the range of from 10 seconds to 20 minutes, with an aqueous liquid having dissolved therein at least one plasticizer, a chemical cross-linking agent comprising at least one cyclic urea compound having at least 2 N-methylol groups, and at least one cross-linking catalyst, b. drying the moulding to a residual water content of from 8 to 12% by weight, and c. heating the moulding at a temperature within the range of from 100 to 150°C for a period of from 30 seconds to 20 minutes.

A moulding, for example a tube, which has been prepared by extruding viscose solution from a shaping die into a precipitation bath then passing the moulding through several washing baths containing water, will be in the gel state, and very heavily swollen. While the cellulose molecules are oriented through the tube being drawn out of the slot die, the structure is still amorphous. The gel state prevents the crystallization of the cellulose hydrate. According to the process of the invention, a cellulose hydrate moulding in the gel state may be converted to a moulding uniformly and sufficiently cross-linked over its cross-section.

According to the prior art, the moulding in the gel state is treated with plasticizer liquid, which generally consists of a 10 to 12% aqueous solution of glycol, a polyglycol or glycerol.

In the present specification, a differentiation is made between swelling agent and plasticizer, though the swelling agent water also exerts a plasticizing action on the moulding. The terminological distinction between the two agents is made here because the amount of swelling agent taken up by the moulding in the course of the process is largely removed again from the moulding while the amount of plasticizer taken up by the moulding is essentially retained therein.

The process according to the invention differs from processes of the prior art in that the cellulose hydrate moulding which is in the gel state is not, as previously, treated with an aqueous solution which contains only dissolved plasticizer, but is treated with an aqueous liquid which contains, as well as plasticizer, a suitable agent for cross-linking the cellulose hydrate molecules and a cross-linking catalyst. The liquid which according to the invention is caused to act on the moulding which is in the gel state accordingly contains a combination of chemical agents, the cooperation of which is decisive for the success of the process according to the invention.

When the process is carried out continuously, cellulose hydrate moulding, which is in the gel state, may be passed at constant speed through a trough which contains an aqueous liquid which is an aqueous plasticizer solution containing a chemical cross-linking agent and a catalyst. The time of action of the aqueous liquid on the moulding is in the range of from 10 seconds to 20 minutes. The liquid is preferably at a temperature in the range of 40° to 80°C, preferably 60° to 80°C. The liquid preferably is composed of a 10 to 12% concentration aqueous solution of glycol, polyglycol or glycerol as the plasticizer, and a chemical agent capable of cross-linking the cellulose molecules in an amount of 0.5 to 15% relative to the weight of the plasticizer solution. The cross-linking agent comprises at least one cyclic urea derivative containing at least two N-methylol groups or of mixtures of these substances.

The following cyclic urea derivatives are particularly suitable for use as cross-linking agents: dimethylol-ethyleneurea (1,3-dimethylol-imidazolid-2-one), dimethylol-dihydroxy-ethyleneurea (1,3-dimethylol-4,5-dihydroxy-imidazolid-2-one), dimethylol-ethyl-triazinone, 3,5-dimethylol-3,5-diaza-tetra-hydropyrone-4, tetramethylolacetylene-diurea, dimethylol-propylene-urea, dimethylol-hydroxypropylene-urea, dimethylol-tetramethylpropylene-urea, 1-(glycol-monomethyl ether)-2-dimethylol carbamate and similar products.

The reaction of the N-methylol groups of the cross-linking agent with the cellulose OH groups which brings about the consolidation and resistance to swelling of the cellulose hydrate tubes and films is an acid-catalyzed reaction. The liquid containing plasticizer and cross-linking agent therefore must have a pH value less than 7, and preferably less than 5. Preferred catalysts are acids, for example sulfuric acid, hydrochloric acid, acetic acid, tartaric acid, oxalic acid, propionic acid, formic acid and other acids having a similar action. Instead of adding acids to the aqueous liquid, salts can be added to the liquid as the catalyst, for example, ammonium chloride, ammonium acetate, magnesium chloride, zinc chloride and zinc nitrate. Mixtures of one or more of these substances also can be used as catalysts. The catalyst is preferably present in the liquid, containing the cross-linking agent, in an amount within the range of from 1 to 5% by weight relative to the amount of cross-linking agent.

It is particularly advantageous if the liquid which produces the plasticization and cross-linking contains both salt and acid of the indicated type as the catalytic agent. The liquid containing plasticizer, cross-linking agent and catalyst may be prepared, for example, by adding to a 10 to 12% concentration aqueous solution of glycol, polyglycol or glycerol, 0.5 to 15% by weight, relative to the weight of the solution, of chemical cross-linking agent and dissolving this in the aqueous plasticizer solution by stirring. The amount of acid required to adjust the pH value to less than 7 is added to the solution prepared as described above, and the salts mentioned are added in an amount of 1 to 5% by weight relative to the amount of the cross-linking agent.

The tube which is in the gel state is advantageously passed in the lay-flat state through the plasticizer bath containing the cross-linking agent and the catalyst.

After the action, on the moulding, of the aqueous liquid containing the cross-linking agent, the plasticizer and the catalyst, the liquid swelling agent (water) in the moulding is removed from the moulding by a drying process, until a residual water content in the range of 8 to 12% is reached. The drying process is carried out, for example, by passing the moulding through a heating chamber which is at a temperature in the range of 70° to 100°C. The action of heat during drying preferably takes place within a period of time in the range of 1 minute to 20 minutes.

The moulding having the indicated residual water content is now exposed to the action of heat in the range of 100° to 150°C for a period of time in the range of 30 seconds to 20 minutes. The shorter period of action in each case corresponds to the higher temperature. As a result of this action of heat, a sufficiently extensive cross-linking of the material which forms the moulding is achieved within a short period of time.

The cross-linking of the material forming the moulding, which is already initiated by the action of heat in the course of the drying process but has not yet advanced sufficiently far in the course thereof, progresses after drying, after storage of the moulding at room temperature. In numerous cases, in practice, the mouldings are stored by the manufacturer for a prolonged period after manufacture, before dispatch. The storage times in general suffice for adequate cross-linking to achieve the desired resistance to swelling and desired mechanical strength occurring. As previously mentioned, it is particularly advantageous to employ a free acid and at the same time one of the salts mentioned as cross-linking catalysts, the liquid containing the cross-linking agent and the plasticizer being adjusted to a pH value between 1 and 5. The speed of the cross-linking reaction can be varied through the pH value. The moisture content of the finished moulding, which is approximately 8 to 12%, ensures that the ions of the catalyst can become active.

The concentration of the coss-linking agent in the plasticizer bath is so chosen, within the range stated, that if appropriate impregnation times and conditions of heat treatment of the impregnated tube are observed, the desired degree of reduction in the swelling index and increase in strength is achieved.

The present invention further provides a process for the manufacture of a cellulose hydrate moulding which comprises i. extruding a viscose solution through a shaping die into a precipitation bath,
ii. treating the moulding formed thereby with an aqueous liquid, having dissolved therein at least one plasticizer, a chemical cross-linking agent comprising at least one cyclic urea compound having at least 2 N-methylol groups, and at least one cross-linking catalyst, iii. drying the moulding to a residual water content of from 8 to 12% by weight, and iv. heating the moulding at a temperature within the range of from 100° to 150°C for a period of from 30 seconds to 20 minutes.

The viscose solution, which may be manufactured in a manner which is in itself known, is preferably extruded through an annular slot die, in the shape of a tube, into a coagulation bath. The coagulation bath preferably is composed of an aqueous solution which contains 14% by weight of sodium sulfate and 12% by weight of $H_2SO_4$, both relative to the total weight of the solution. Such a coagulation bath is known as a "Muller bath". The tube then may be passed through several washing baths; the washing liquid is water. Water is taken up by the moulding, which becomes heavily swollen and is in the gel state, as previously described. By means of this process, it is possible, without additional process steps and without a rearrangement of the customary and well-proven manufacturing sequence, to manufacture mouldings of cellulose hydrate which are uniformly and sufficiently cross-linked over their cross-section. Only under these conditions do they display the desired strength and swelling resistance values in respect of which they are superior to cellulose hydrate mouldings manufactured according to previously proposed processes.

Because of the above-mentioned physical criteria, cellulose hydrate tubes manufactured according to the invention are particularly advantageously suitable for use as artificial sausage casings.

The process according to the invention permits the manufacture, especially the continuous manufacture, of consolidated mouldings of improved resistance to swelling, without exceeding the customary impregnation time of known manufacturing processes which is required for the action of the plasticizer, and with low concentrations of cross-linking agent — in contrast to known processes — sufficing in the cross-linking solution employed, and with the desired uniform cross-linking not necessarily requiring a heat treatment at a temperature of 160°C.

The amount of cross-linking agent incorporated into the tube through chemical bonding preferably lies in the range of 0.1 to 15%, more preferably 1 to 8%, relative to the total weight of the tube.

The amount of cross-linking agent taken up by the tube and firmly incorporated therein by chemical bonding can be determined by first extracting the tube manufactured according to the invention with water for 5 hours and thereafter carrying out a nitrogen determination on the material of the tube.

The tube acquires the desired properties because, due to the process, the cross-linking agent can become uniformly distributed over the cross-section of the tube wall, that is to say, there is no concentration gradient of the cross-linking agent, which after cross-linking is firmly incorporated, over the total wall cross-section.

The process is preferably carried out by allowing the acid solution containing the cross-linking agent and the plasticizer to act only on the outside of the tube. However, this liquid also can be allowed to act on the outside and on the inside, or only on the inside. The action of the liquid on the inside of the tube takes place in a manner which is in itself known and is no part of the present invention.

The degree of swelling of the tube or of the film may be determined according to a method described in "Farbereiund textiltechnische Untersuchungen", Hermann-Agstar, Springer-Verlag, 1956, page 400 or in "Zellcheming-Merkblatt", IV/33/57.

A moulding, especially a tube or a film, of cellulose is regarded as being in the gel state, for the purposes of this invention, if it contains from 300 to 330% by weight (degree of swelling) of swelling liquid (water).

A cellulose hydrate tube manufactured according to previously proposed processes, in which, after the drying process and after extensive removal of the swelling agent from the tube, the crystallization already has taken place, can still be swollen only by an amount in the range of 150 to 160% through the subsequent action of liquid swelling agent.

The process according to the invention permits the manufacture of cellulose hydrate tubes or films which are substantially improved, in respect of a whole series of properties, relative to known cellulose hydrate tubes or films. According to the process of the invention, the degree of swelling of the tube can be selected within wide limits, and its strength can be increased without the material thereby becoming brittle or friable. The tube according to the invention, or the film according to the invention, shows increased dimensional stability and a reduction in the permeability to water vapor, oxygen and $CO_2$. The properties of the cellulose film, therefore, are made more similar to those of a plastic film without as a result losing the advantageous properties of cellulose hydrate film, which include, above all, biological degradability.

A further advantage of the process is that because of the better physical properties of the tube or film which can be manufactured it is possible to reduce the wall thickness of the tube or the thickness of the film without reducing the properties in use.

For the cellulose hydrate tubes manufactured according to the process of the invention, the improvement in properties which has been described is particularly important if the tubes are used as sausage casings. A particular advantage is the increased wet strength of the tubes which substantially improves their utility.

The dimensional stability in the case of films corresponds in the case of tubes which are used as sausage casings, to their constancy of gauge, which is also a particularly important property for this use.

The bursting pressure of a typical tube, of wall thickness $30\mu$, is 5 to 7 m of water, and its elongation at the bursting point is 25%.

The tube mentioned has a tearing length (the length at which it tears under its own weight) of 3,000 to 3,500 m in the longitudinal direction and a tearing length of 2,800 to 3,000 m in the transverse direction. The average degree of polymerization of the viscose used for the manufacture of the tube is 480 to 550.

The tearing lengths in the longitudinal and transverse directions are a measure of the mechanical strength of the tube.

The viscose solution may contain, for example, 86% of water, 5% of sodium hydroxide, 2% of carbon disulfide and 7% of cellulose.

The following Examples further illustrate the invention.

EXAMPLE 1

Viscose solution composed of approximately 86% of water, approximately 2% of carbon disulfide, approximately 5% of sodium hydroxide solution and approximately 7% of cellulose and having a γ-value of 30 (relative to 100 glucose units) was extruded from the gap of an annular slot die (gauge 18) into a precipitation bath composed of an aqueous solution which contains 14% of sodium sulfate and 12% of sulfuric acid relative to the total weight of the solution and the product was passed through several acid baths and water baths for regeneration and then washed in a water bath. As a result of the absorption of water, the tube thereafter displayed a degree of swelling of 320%, relative to the dry weight of the tube (amount by weight of cellulose hydrate plus plasticizer). Thereafter, the tube which, due to the high water content, was in the gel state, was passed through a bath liquid at 70°C, which had the following composition:

100 kg of bath liquid contained:
a. 82 kg of water,
b. 12 kg of glycerol,
c. 5 kg of dimethylol-dihydroxy-ethyleneurea, and
d. 1 kg of magnesium chloride.

The solution was prepared by first introducing the appropriate amounts of components (b), (c) and (d) into a container and then making up to 100 kg with water and stirring.

The liquid was adjusted to a pH-value of 2.5 by adding the appropriate amount of concentrated sulfuric acid.

The tube was passed continuously, at a speed of 21 m/second, through a bath composed of the above-mentioned liquid. The dwell time of the tube in contact with the liquid was 24 seconds in the impregnation bath. After it had issued from the impregnation bath, the tube was freed of excess bath liquid, with the aid of squeeze rollers, and was then passed at a continuing constant speed through a 45 m long drying tunnel in which the internal temperature was 94°C. The dwell time of the tube in the drying tunnel was 2.8 minutes. After this heat treatment, the tube had a residual water content of 10% by weight and its plasticizer content was 20% by weight. Thereafter, the tube was exposed to heat treatment at 110°C for a period of 2 minutes by passing it through an appropriately temperature-controlled heating chamber. The degree of swelling of the tube was then 115% while a tube which had been manufactured under otherwise identical conditions but without addition of cross-linking agent and catalyst in the plasticizer bath showed a degree of swelling of 163%.

The amount of dimethylol-dihydroxy-ethyleneurea chemically incorporated into the tube was 2.8% after extraction of the tube with water at 25°C for a period of 5 hours (nitrogen content of the tube 0.460%).

The tube thus manufactured had a wall thickness of 30μ, its bursting pressure was 5.3 m of water and is elongation at the bursting point was 24%.

The tube had an alternating flexing resistance of 8,250 flexings, a longitudinal tearing length of 3,380 m and a transverse tearing length of 2,900 m.

The viscose used for the manufacture of the tube had an average degree of polymerization of 480.

EXAMPLE 2

This example was carried out as described in Example 1, except that after drying to the water content indicated in Example 1, the tube was subjected to a further heat treatment at 140°C for a period of 5 minutes.
Degree of swelling of the tube: 92%.
Degree of swelling of the comparison tube (according to the conditions of Example 1): 150%.
Amount of dimethylol-dihydroxy-ethyleneurea firmly incorporated into the tube wall through chemical bonding: 3.7% (nitrogen content of the tube: 0.61%).
Bursting pressure of the tube: 5.0 m water column
Elongation at the bursting point: 20%
Resistance to alternating flexing: 7,850 flexings
Longitudinal tear length: 3,250 m
Transverse tear length: 2,900 m

EXAMPLE 3

This example was carried out as described in Example 1, except that the liquid containing the cross-linking agent was adjusted to a pH value of 1 by adding an appropriate amount of sulfuric acid and the tube, after drying to a water content of 10% according to the procedure of Example 1, was subsequently exposed to a temperature of 150°C for a period of 5 minutes.
Degree of swelling of the tube: 80%
Degree of swelling of the comparison tube (see Example 1): 150%
Amount of dimethylol-dihydroxy-ethyleneurea firmly incorporated into the tube wall by chemical bonding: 4.6%.
(nitrogen content of the tube: 0.76%)
Bursting pressure of the tube: 4.8 m water column
Elongation at the bursting point: 20%
Resistance to alternating flexing: 7,600 flexings
Longitudinal tear length: 3,200
Transverse tear length: 2,900

Under a procedure otherwise identical to that indicated above, except that the heat treatment at 120°C which followed the drying took place for 5 minutes, the degree of swelling of the tube was about 99% in comparison to 150% for the comparison tube according to the conditions of Example 1. The bursting pressure of the tube was 5.3 m of water, its elongation at the bursting point was 24%, its resistance to alternating flexing was 8,000 flexings, its longitudinal tearing length was 3,400 m and its transverse tearing length was 2,980 m. The amount of dimethylol-dihydroxy-ethyleneurea firmly incorporated into the wall of the tube by chemical bonding was 3.4% and the nitrogen content of the tube was 0.57%. When the method of manufacture of Example 3 was varied by drying the tube to the residual water content of 10% under the conditions according to Example 1, and then carrying out a heat treatment for one minute at 140°C, a tube having a degree of swelling of 99% was obtained, while the comparison tube according to the conditions of Example 1 showed a degree of swelling of 150%. The amount of dimethylol-dihydroxy-ethyleneurea firmly incorporated into the wall of the tube by chemical bonding was 3% and the nitrogen content of the tube was 0.48%.

EXAMPLE 4

The procedure of Example 1 was repeated, except for the modification that the impregnating solution used contained 80 kg of water, 15 kg of glycerol, and 5 kg of dimethylol-dihydroxy-ethyleneurea per 100 kg of solution.

Sulfuric acid was used as the catalyst. The pH value of the above-mentioned solution was adjusted to 1 by adding the appropriate amount of concentrated sulfuric acid. The tube was then exposed for varying times to the above-mentioned liquid by filling the tube with the liquid and then suspending it in a bath composed of this liquid. The tube was then withdrawn from the bath, freed of the excess liquid by squeezing it out between squeeze rollers and then dried for 20 minutes in a drying cabinet which was heated to 100°C; thereafter the finished tube was exposed to a further heat treatment at 140°C for a period of 10 minutes.

The following results were found:

| Impregnation time (minutes) | Degree of swelling % | Degree of swelling of the untreated tube % | Incorporated quantity % |
|---|---|---|---|
| 10 | 80 | 134 | 4.8 |
| 5 | 90 | 130 | 3.5 |
| 1 | 102 | 124 | 2.3 |
| ½ | 104 | 124 | 2.3 |

EXAMPLE 5

The procedure of Example 4 was repeated, except that the impregnation bath had the following composition: 100 kg of solution contained 73 kg of water, 15 kg of glycerol, 10 kg of dimethyloldihydroxy-ethyleneurea and 2 kg of magnesium chloride.

The tube was then treated under the conditions indicated in Example 4 with the solution from the inside and outside for 10 minutes, dried at a temperature of 98°C for a period of 4 minutes to the stated residual water content and thereafter subjected to a further heat treatment at 140°C for a period of 3 minutes. The degree of swelling of the tube was then 108%, the degree of swelling of a comparison tube was 133% and the amount of cross-linking agent incorporated into the tube was 2.5%.

EXAMPLE 6

The procedure of Example 4 was repeated, except that the impregnating solution employed had the following composition: 100 kg of solution contained 80 kg of water, 15 kg of glycerol and 5 kg of dimethylol-dihydroxy-ethyleneurea.

The pH value of the liquid was adjusted to 1 by adding the appropriate amount of concentrated sulfuric acid. The tube was then impregnated at room temperature under the conditions indicated in Example 5, squeezed out, dried to a residual water content of 8% for a period of 8 minutes at a temperature of 92°C and exposed to a further heat treatment for 10 minutes in a drying cabinet at 140°C.

The tube showed a degree of swelling of 82% as compared to 130% for the comparison tube (according to the conditions of Example 1). The amount of dimethylol-dihydroxy-ethyleneurea incorporated into the tube was 4.6%.

EXAMPLES 7 to 12

The process conditions in each case were as in Example 4 with the modification that after drying the tube, it was exposed to a further heat treatment at 140°C for a period of 15 minutes in a drying cabinet. As a further difference from Example 4, the cross-linking agents employed were those indicated under (7) to (12) in the table which follows, in each case in the amount indicated in Example 4.

In the second column, the table shows the degrees of swelling achievable in each case, while the third column shows the degrees of swelling of a comparison tube according to the conditions of Example 1.

| | Cross-linking agent | Degree of swelling % | Degree of swelling of a comparison tube |
|---|---|---|---|
| (7) | 3,5-Dimethylol-3,5-diaza-tetrahydropyrone-4 | 105 | 142 |
| (8) | Dimethylol-ethyl-triazinone | 112 | 140 |
| (9) | Tetramethylol-acetylene-diurea | 78 | 140 |
| (10) | Dimethylol-propylene-urea | 90 | 140 |
| (11) | Dimethylol-tetramethyl-propyleneurea | 118 | 140 |
| (12) | Dimethylol-hydroxyl-propyleneurea | 105 | 140 |

The degrees of swelling indicated for a comparison tube in the case of all examples relate to tubes which have been manufactured under the conditions indicated in the particular example, with the modification that the impregnating solution used contains no cross-linking agent and no catalyst.

It will be obvious to those skilled in the art that many modifications may be made within the scope of the present invention without departing from the spirit thereof, and the invention includes all such modifications.

What is claimed is:

1. A process for the preparation of a cellulose hydrate moulding which comprises
   a. treating a cellulose hydrate moulding while in the gel state, for a period within the range of from 10 seconds to 20 minutes, with an aqueous liquid having a pH value of less than 7 and having dissolved therein at least one plasticizer, a chemical cross-linking agent comprising at least one cyclic urea compound having at least 2 N-methylol groups and being present in an amount of 0.5 to 15% relative to the weight of the plasticizer solution, and at least one cross-linking catalyst selected from the group consisting of an acid and an acid salt,
   b. drying the moulding to a residual water content of from 8 to 12% by weight, and
   c. heating the moulding at a temperature within the range of from 100° to 150° C for a period of from 30 seconds to 20 minutes.

2. A process as claimed in claim 1 wherein the aqueous liquid has a pH value of less than 5.

3. A process as claimed in claim 1 wherein the aqueous liquid is at a temperature within the range of from 40° to 80°C.

4. A process as claimed in claim 3 wherein the aqueous liquid is at a temperature within the range of from 60° to 80°C.

5. A process as claimed in claim 1 wherein the concentration of plasticizer in the aqueous liquid is from 10 to 12% by weight.

6. A process as claimed in claim 1 wherein the plasticizer comprises at least one glycol, polyglycol, or glycerol.

7. A process as claimed in claim 1 wherein the concentration of cross-linking agent in the aqueous liquid is from 0.5 to 15% by weight.

8. A process as claimed in claim 7 wherein the concentration of cross-linking agent is from 1 to 8% by weight.

9. A process as claimed in claim 1 wherein the cross-linking catalyst is present in an amount of from 1 to 5% by weight relative to the cross-linking agent.

10. A process as claimed in claim 1 wherein the cross-linking catalyst comprises an acid.

11. A process as claimed in claim 10 wherein the cross-linking catalyst comprises at least one acid selected from the group consisting of sulfuric acid, hydrochloric acid, acetic acid, tartaric acid, oxalic acid, propionic acid and formic acid.

12. A process as claimed in claim 1 wherein the cross-linking catalyst comprises an acid salt.

13. A process as claimed in claim 12 wherein the cross-linking catalyst comprises at least one salt selected from ammonium chloride, ammonium acetate, magnesium chloride, zinc chloride and zinc nitrate.

14. A process as claimed in claim 10 wherein the cross-linking catalyst comprises both an acid and an acid salt.

15. A process as claimed in claim 1 wherein the cross-linking agent comprises dimethylol-ethyleneurea.

16. A process as claimed in claim 1 wherein the cross-linking agent comprises dimethylol-dihydroxy-ethyleneurea.

17. A process as claimed in claim 1 wherein step (a) is carried out for a period within the range of from 10 to 40 seconds.

18. A process as claimed in claim 1 wherein step (b) is carried out at a temperature within the range of from 70° to 100°C.

19. A process as claimed in claim 1 wherein step (b) is carried out for a period within the range of from 1 to 20 minutes.

20. A cellulose hydrate moulding prepared by a process as claimed in claim 1.

21. An artificial sausage casing comprising a cellulose hydrate tube prepared by a process as claimed in claim 1.

22. A process as claimed in claim 1 wherein the cross-linking agent is a cyclic urea derivate containing at least two N-methylol groups, selected from the series consisting of dimethylolethyleneurea (1,3-dimethylol-imidazolid-2-one), dimethyloldihydroxy-ethyleneurea (1,3-dimethylol-4,5-dihydroxy-imidazolid-2-one), dimethylol-ethyl-triazinone, 3,5-dimethylol-3,5-diazatetra-hydropyrone-4, tetramethylol-acetylene-diurea, dimethylolpropylene-urea dimethylol-hydroxypropylene-urea, dimethylol-tetramethylpropylene-urea, and 1-(glycol-monomethyl ether)-2-dimethylol carbamate.

* * * * *